United States Patent [19]
Ladany

[11] 3,863,381
[45] Feb. 4, 1975

[54] CORD WINDING DEVICE PARTICULARLY FOR FISHING RODS

[76] Inventor: Shaul P. Ladany, 5700 Arlington Ave., Apt. 165, Bronx, N.Y. 10471

[22] Filed: Mar. 7, 1974

[21] Appl. No.: 448,940

[52] U.S. Cl............................ 43/25, 43/15, 43/25
[51] Int. Cl.............................................. A01k 87/04
[58] Field of Search ........................................ 43/25

[56] References Cited
UNITED STATES PATENTS
2,233,311  2/1941  Harne ................................... 43/25
2,640,290  6/1953  Ames ..................................... 43/15

*Primary Examiner*—Louis G. Mancene
*Assistant Examiner*—Peter Skiff
*Attorney, Agent, or Firm*—Benjamin J. Barish

[57] ABSTRACT

Described is a fishing rod including a cord winding device having a pair of rollers rotatably mounted on a bracket attached to the fishing rod, the rollers being formed with grooves for receiving the cord around one and then around the other in an S-formation, thereby tensioning the cord as it is wound and unwound from the reel, the cord being easily unseatable from the groove by the user to enable its quick unreeling from the reel.

9 Claims, 4 Drawing Figures

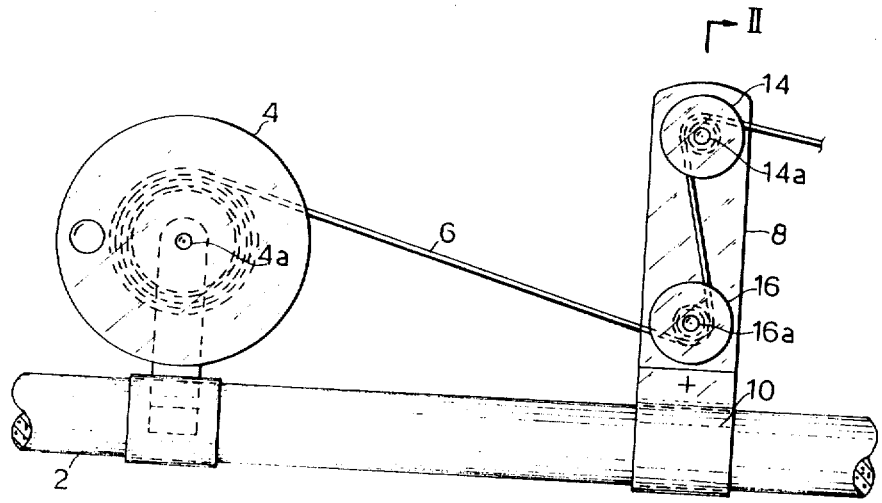
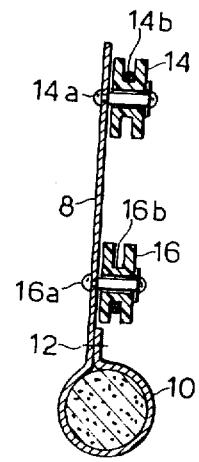
FIG.1  FIG. 2
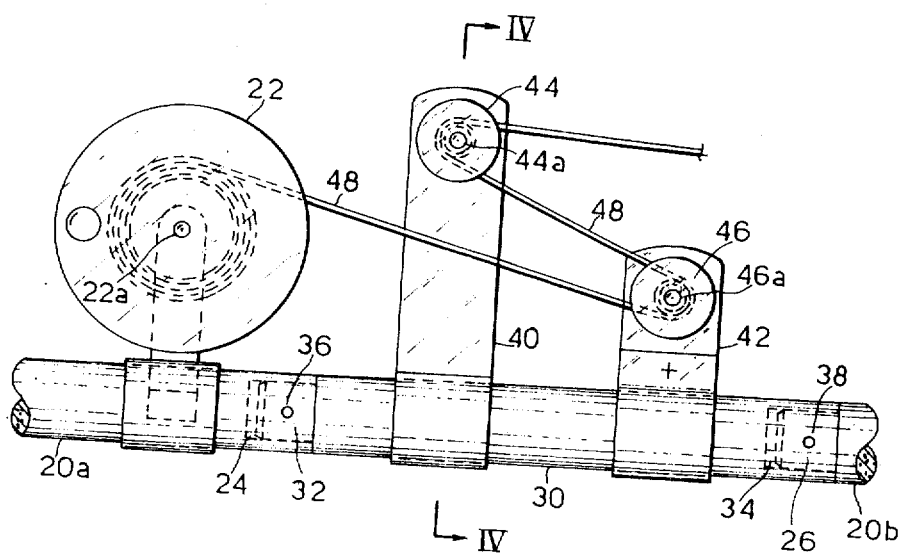
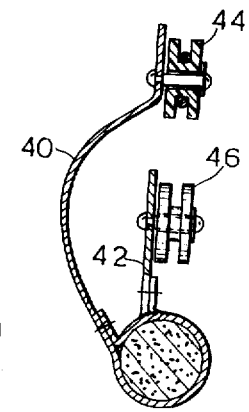
FIG.3  FIG. 4

CORD WINDING DEVICE PARTICULARLY FOR FISHING RODS

BACKGROUND OF THE INVENTION

The present invention relates to cord winding devices, and particularly to fishing rods including such devices.

Fishing rods are usually provided with reels or drums (hereinafter called reels) on which the cord is wound. The simpler and less expensive types of fishing rods include plain reels having no special means for ensuring the neat and orderly winding of the cord, and therefore the winding of the cord on the reel must be done relatively slowly to avoid entanglement. The more expensive types of fishing rods are commonly equipped with a guiding arm moving parallel to the reel as each loop is wound. Such guiding arm arrangements contain a large number of parts, such as cams and gears, which are expensive to produce and to maintain. Moreover the known guiding arm arrangements of this type do not generally permit quick unwinding of the cord when the fishing line is cast into the water, for example, and therefore many fishermen prefer the simple type of fishing rod.

OBJECTS AND SUMMARY OF THE PRESENT INVENTION

An object of the present invention is to provide a cord-winding device particularly for fishing rods having advantages in the above respects.

According to the present invention, there is provided a cord winding device, particularly for fishing rods, including a reel for winding and unwinding the cord, and a supporting member rotatably supporting the reel. The cord winding device comprises bracket means attached to the supporting member at a location spaced longitudinally thereof, and further includes a pair of rollers rotatably mounted on the bracket means and spaced from each other transversely of the supporting member.

The axes of rotation of the rollers are parallel to each other and to the axis of rotation of the reel. The rollers are formed with grooves for receiving the cord around one and then around the other, in an S-formation. This tensions the cord as it is wound and unwound from the reel, thereby assuring a more orderly winding and unwinding. Further, the cord is easily unseatable from the grooves of the roller by the user's finger, to enable the quick unreeling of the cord from the reel, such as when casting the line.

The invention is particularly useful for fishing rods, wherein the supporting member is the rod itself.

Two embodiments of the invention are described below. In one embodiment, the axes of rotation of the pair of rollers are aligned with each other transversely to the rod, and in this embodiment the bracket means comprises a single arm extending transversely to the rod and carrying both rollers in alignment with each other. In a second described embodiment, the axes of rotation of one of the rollers is between the axes of rotation of the other roller and of the reel. In this embodiment the bracket means comprises a pair of arms each carrying one of the rollers, the arms being spaced from each other longitudinally of the rod.

Various means may be provided for attaching the bracket means to the rod. In one embodiment, the bracket comprises a ring clamped to the rod, and in a second described embodiment, wherein the rod comprises two sections coaxially attachable to each other, the bracket means comprises a rod insertable between the two sections.

Further features and advantages of the invention will be apparent from the description below.

BRIEF DESCRIPTION OF THE DRAWINGS

The invention is herein described, by way of example only, with respect to two preferred embodiments thereof illustrated in the drawings, wherein:

FIG. 1 is a side elevational view, partly in section, illustrating a fishing rod including a cord winding device constructed in accordance with the invention;

FIG. 2 is a transverse sectional view along the lines II — II of FIG. 1;

FIG. 3 is an elevational view of a fishing rod including a cord winding device constructed in accordance with another embodiment of the invention; and FIG. 4 is a transverse sectional view along lines IV — IV of FIG. 3.

DESCRIPTION OF THE PREFERRED EMBODIMENT

The fishing rod illustrated in FIGS. 1 and 2 of the drawings comprises a conventional rod 2 to which is attached to a rotatable reel 4 for winding and unwinding the fishing cord or line 6. The fishing rod 2 further includes a bracket 8 carried by a ring 10 clamped, as by bolt 12, to the fishing rod 2.

In this embodiment, bracket 8 is in the form of a single arm which extends transversely to the longitudinal axis of the fishing rod, and carries a pair of rollers 14, 16 whose rotatable axes of rotation 14a, 16a are aligned with each other transversely to rod 2.

As clearly shown in FIG. 1, the axes of rotation 14a, 16a of rollers 14, 16 are parallel to each other and to the axis of rotation 4a of the reel 4.

Rollers 14 and 16 are formed with grooves for receiving the cord or line 6 in an S-formation as shown in FIG. 1. Thus, cord 6 passes from reel 4 to the underside of roller 16, makes one-half loop thereon, passes to the underside of roller 14, and exits from the upperside of that roller after making another one-half loop.

Grooves 14b, 16b of the two rollers may take different configurations. In FIG. 2 they are illustrated as having substantially parallel side walls with a rounded bottom, but they could also have tapered side walls to accommodate cords of different diameters, preferably, the depth of the grooves is 2-3 times the diameter of the cord 6, so as to prevent unseating of the cord during winding or unwinding.

The foregoing arrangement provides a tension to the cord as it is wound and unwound from reel 4, and thereby assures a more orderly winding and unwinding of the cord. This arrangement also enables the user to effect a quick unreeling of the cord from the reel by using his fingers to unseat the cord from both rollers 14 and 16.

FIGS. 3 and 4 illustrate a second embodiment of the invention, also applicable with respect to fishing rods. In the embodiment of FIGS. 3 and 4, the fishing rod is of the type including two rod sections 20a, 20b attachable coaxially to each other. Section 20a serves as, or is connected to, the handle grasped by the user, and section 20b carries the cord guide at its tip (not shown). The normal winding reel 22 is carried by the handle section 20a. The two sections 20a and 20b are normally attachable to each other by means of a blind bore or recess 24 formed at the end of section 20a, receiving a pin 26 formed at the end of section 20b.

The cord winding device in the embodiment of FIGS. 3 and 4 includes a rod 30 formed at one end with a pin 32 correponding to pin 26 and receivable within recess 24 of section 20a. At the opposite end, rod 30 is with a recess 34 corresponding to recess 24 of section 20a for receiving pin 26 of section 20b.

The three sections may be held together by press-fitting, or fasteners may be used as shown schematically at 36 and 38.

Rod 30 comprises two bracket arms 40, 42 both extending transversely to the longitudinal axis of the fishing rod. Bracket 40 carries one roller 44, and bracket 38 carries the second roller 46. Bracket 42 is straight and is of the shorter length of the two, whereas bracket 40 is curved, as shown in FIG. 4. The axes of rotation of the two rollers 44, 46 are parallel to each other and to the axis of rotation 22a of the reel. However, the axes of rotation of the two rollers are not aligned with each other, as in the FIGS. 1–2 embodiment, but rather the axis 44a of roller 44 is between the axes 46a and 22a of the other roller and of the reel, respectively.

Both rollers 44 and 46 are grooved for receiving the cord 48 in an S-formation as in the FIGS. 1–2 arrangement.

In the FIGS. 3–4 embodiment, however, since the two rollers are not aligned with each other in a straight line transversely of the longitudinal axis of the rod, they provide a greater angle of wrap of the cord around each roller. This produces a greater tensioning of the cord as it is wound and unwound from the reel, and therefore better assures an orderly winding and unwinding. Arm 40 is curved, as shown in FIG. 4, to avoid interference with the portion of the cord extending between the rollers and the reel.

The cord, in the winding device of FIGS. 3 and 4, may also be easily unseated from the two rollers 44, 46 by the user's finger, to enable a quick unreeling of the cord from the reel, for example when casting the line.

While the invention has been described with respect to two preferred embodiments, it will be appreciated that any other forms and applications thereof may be made.

What is claimed is:

1. A cord winding device, particularly for fishing rods, including a reel for winding and unwinding the cord, and a supporting member rotatably supporting the reel, the cord winding device comprising bracket means attached to the supporting member at a location spaced longitudinally thereof, and a pair of rollers rotatably mounted on said bracket means and spaced from each other transversely of the supporting member, the axes of rotation of the rollers being parallel to each other and to the axis of rotation of the reel, said rollers being formed with grooves for receiving the cord around one and then around the other in an S-formation, thereby tensioning the cord as it is wound and unwound from the reel, the cord being easily unseatable from the grooves by the user to enable its quick unreeling from the reel.

2. A cord winding device as defined in claim 1, wherein the axis of rotation of the pair of rollers are aligned with each other transversely to said supporting member.

3. A cord winding device as defined in claim 1, wherein the axes of rotation of one of the rollers is between the axes of rotation of the other roller and the reel.

4. A cord winding device as defined in claim 1, wherein said bracket means comprises a single arm extending transversely to said supporting member and carrying both said rollers in alignment with each other.

5. A cord winding device as defined in claim 1, wherein said bracket means comprises a pair of arms each carrying one of said rollers, said arms being spaced from each other along the supporting member.

6. A cord winding device as defined in claim 5, wherein one of said arms in straight and the other is curved to avoid interference with the portion of the cord extending between the rollers and the reel.

7. A cord winding device as defined in claim 1, wherein said supporting means comprises a rod, and said bracket means comprises a ring clamped to the supporting rod.

8. A cord winding device as defined in claim 1, wherein said supporting member comprises two rod-type sections coaxially attachable to each other, and said bracket means comprises a rod insertable between the two said sections.

9. A fishing rod including a reel rotatably carried thereon, and a cord winding device as defined in claim 1 attached thereto.

* * * * *